Patented May 4, 1943

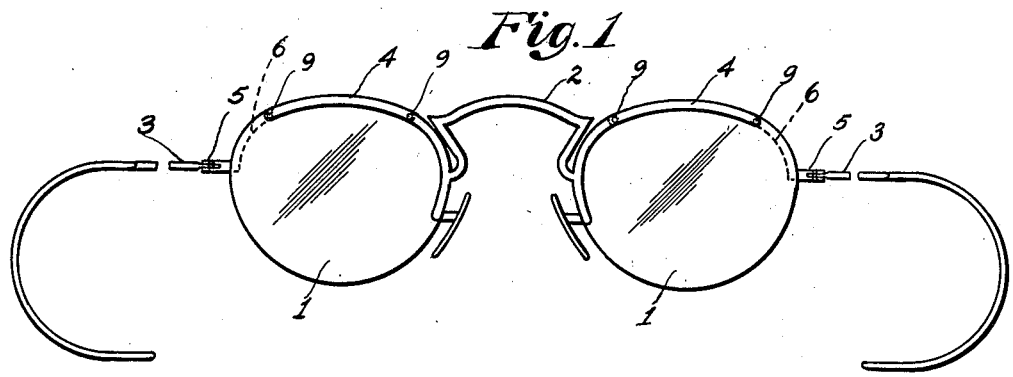
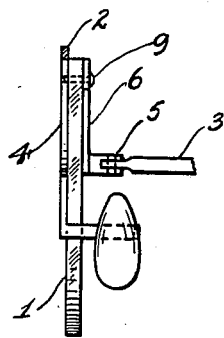
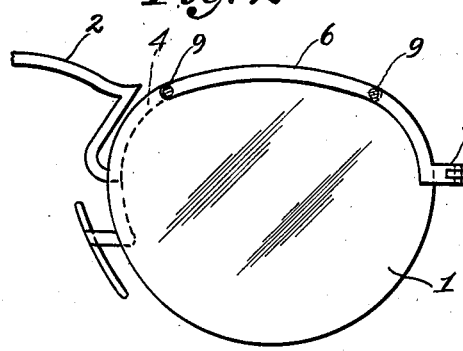
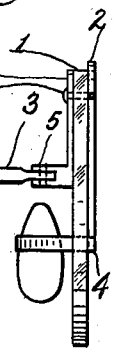
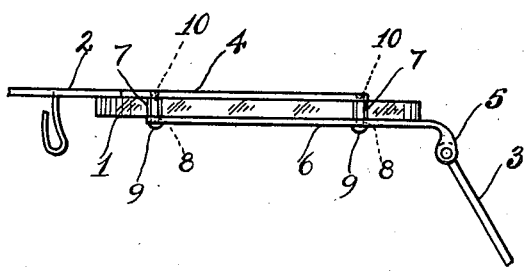
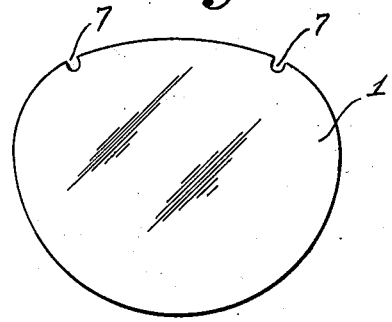

2,318,537

UNITED STATES PATENT OFFICE 2,318,537

OPHTHALMIC SPECTACLES

Harry Stolper, New York, N. Y.

Application December 5, 1941, Serial No. 421,716

4 Claims. (Cl. 88—41)

This invention relates to ophthalmic spectacles, and its principal object is to provide a pair of spectacles which is simplified, conveniently and economically manufacturable, light, strong, durable, improved, and affords a firm and efficient securing of the lenses, an unobstructed field of vision, and a minimum of conspicuousness.

Other objects and advantages will hereinafter appear.

In the accompanying drawing:

Fig. 1 is a general front elevation of the spectacles constituting the invention.

Fig. 2 is a rear view, in an enlarged scale, showing the left-hand portion of the spectacles illustrated in Fig. 1.

Fig. 3 is an end elevation of the spectacles portion shown in Fig. 2.

Fig. 4 is a similar opposite end elevation of the same spectacles.

Fig. 5 is a top plan view of the spectacles portion shown in Fig. 2.

Fig. 6 is an elevational view of one of the lenses of the spectacles.

The pair of spectacles comprises a pair of ophthalmic lenses 1, Fig. 1, a connecting bridge 2, and a pair of temple bows 3. Integral with each side of the bridge 2 is formed a fractional lens-rim 4, which projects therefrom and extends along the upper part of the contour of the lens 1, in the manner illustrated, and bears upon the front surface of the lens. Each of the temples 3 carries a hinge 5, integral with which is formed another fractional lens-rim portion 6 that projects therefrom and similarly extends along the upper part of the contour of the lens 1, and bears in parallelism with the rim 4 upon the opposite or rear surface of the lens. Each of the lenses 1, Fig. 6, is provided in the upper part of its peripheral edge with a pair of recesses 7. Each of the inner rim portions 6 is provided with holes 8 for receiving screws 9 that pass through the lens recesses 7 and thread into taps 10 provided in the outer rim portions 4, whereby both fractional rims 6, 4 are firmly secured to each other and efficiently fasten the lenses 1 against any possible displacement relatively to the bridge 2 and temples 3.

It will be evident to those versed in this art that spectacles made by the provisions of this invention will inherently embody all of the above mentioned advantages, and should breakage therein occur through violent damage either of its lenses may be readily and conveniently replaced, by disassemblage and reassemblage of the fractional rims 6, 4, or other parts of the spectacles may be replaced with utilization of the undamaged parts.

Variations may be resorted to within the scope of the invention.

I claim:

1. In spectacles, the combination with a lens having open notches in its periphery, of a bridge, a temple, said bridge carrying a portion of a rim for said lens, said rim being located against one of the surfaces of said lens, said temple carrying a similar portion of a rim located against the opposite surface of said lens in parallelism with said other rim, means for securing each of said rims to the other of said rims, and said securing means passing through said notches.

2. In spectacles, the combination with a lens, of a bridge, a temple, said bridge carrying a portion of a rim for said lens, said rim being located against one of the surfaces of said lens, said temple carrying a similar portion of a rim located against the opposite surface of said lens, and each of said rims having means for securing it to the other of said rims and to the lens.

3. In spectacles, the combination with a lens, of a bridge, a temple, said bridge carrying a portion of a rim for said lens, said rim being located against one of the surfaces of said lens, said temple carrying a similar portion of a rim located against the opposite surface of the lens, and screws passing through one of said rims threading into the other of said rims for securing them to each other and to the lens.

4. In spectacles, the combination with a lens having recesses in its periphery, of a bridge, a temple, said bridge carrying a portion of a rim for said lens, said rim being located against one of the surfaces of said lens, said temple carrying a similar portion of a rim located against the opposite surface of said lens in parallelism with said other rim, and screws passing through one of said rims and recesses threading into the other of said rims for securing them to each other and to the lens.

HARRY STOLPER.